(12) United States Patent
Taniguchi et al.

(10) Patent No.: US 7,136,740 B2
(45) Date of Patent: Nov. 14, 2006

(54) MACHINE TOOL CONTROL APPARATUS

(75) Inventors: Mitsuyuki Taniguchi, Gotenba (JP);
Keisuke Imai, Yamanashi (JP); Masato Aochi, Gotenba (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/288,284

(22) Filed: Nov. 29, 2005

(65) Prior Publication Data

US 2006/0116804 A1    Jun. 1, 2006

(30) Foreign Application Priority Data

Nov. 30, 2004    (JP)    ............................. 2004-346461

(51) Int. Cl.
*G06F 19/00*    (2006.01)
*G06G 7/76*    (2006.01)
*B23Q 15/00*    (2006.01)

(52) U.S. Cl. ..................... 701/110; 701/70; 318/561

(58) Field of Classification Search ................ 701/110, 701/114, 115, 102, 70, 50, 94; 318/561, 318/632, 560; 123/350, 352
See application file for complete search history.

(56) References Cited

U.S. PATENT DOCUMENTS

| | | | | |
|---|---|---|---|---|
| 4,484,287 A | * | 11/1984 | Gamo et al. | ................. 700/177 |
| 4,503,372 A | * | 3/1985 | Nozawa et al. | ............. 318/560 |
| 4,926,334 A | * | 5/1990 | Suzuki et al. | ................. 701/94 |
| 6,759,973 B1 | * | 7/2004 | Villaret et al. | ................. 341/11 |

* cited by examiner

*Primary Examiner*—Hieu T. Vo
(74) *Attorney, Agent, or Firm*—Drinker Biddle & Reath LLP

(57) ABSTRACT

The invention aims to reduce an error occurring due to the mounting condition of an acceleration sensor. In the case of a two-axis sensor, an angle θ is calculated from outputs (x', y') that the acceleration sensor produces when known accelerations (x, y) are applied, and the angle θ is stored in a storage device contained in a casing in which the acceleration sensor is housed. In the case of a one-axis sensor, the ratio of the magnitudes of accelerations is stored. The acceleration detected by the acceleration sensor is compensated by using the value stored in the storage device.

4 Claims, 3 Drawing Sheets

US 7,136,740 B2

MACHINE TOOL CONTROL APPARATUS

BACKGROUND OF THE INVENTION

1. Field of the Invention

The present invention relates to a machine tool control apparatus which measures not only the position/speed of a driven body but also the acceleration thereof and which performs control by taking account of the acceleration.

2. Description of the Related Art

In a machine tool control apparatus, feedback control is performed by detecting the position/speed of a driven body and by computing the amount of control based on the difference between the detected position/speed and its command value. However, if a low-rigidity part such as a joint is interposed between the driven body and the detector, as is the case when the driven body is, for example, an indexing table, the driven body may vibrate due to the presence of the low-rigidity part. To address this problem, there is a need to perform control by detecting the acceleration of the driven body and compensating the command value based, for example, on the detected acceleration.

When installing an acceleration sensor for detecting the acceleration of the driven body, the sensor must be mounted by orienting the acceleration detection element so that its detection direction coincides with the direction in which the acceleration is to be detected; otherwise, an error would be induced in the detected acceleration, and the desired controlled condition could not be achieved.

SUMMARY OF THE INVENTION

Accordingly, it is an object of the present invention to provide a machine tool control apparatus in which an acceleration detection error due to the mounting condition of an acceleration sensor is reduced.

According to the present invention, there is provided a machine tool control apparatus comprising: a position/speed detector detecting at least one of the speed and position of a driven body; an acceleration detection element detecting the acceleration of the driven body; a storage device storing a compensation value to be used for compensating the acceleration detected in operation by the acceleration detection element; and a control processor controlling the driving of the driven body based on a command value for at least one of the speed and position of the driven body, a detection value fed from the position/speed detector, and the compensated acceleration.

DESCRIPTION OF THE PREFERRED EMBODIMENTS

Figure 1:
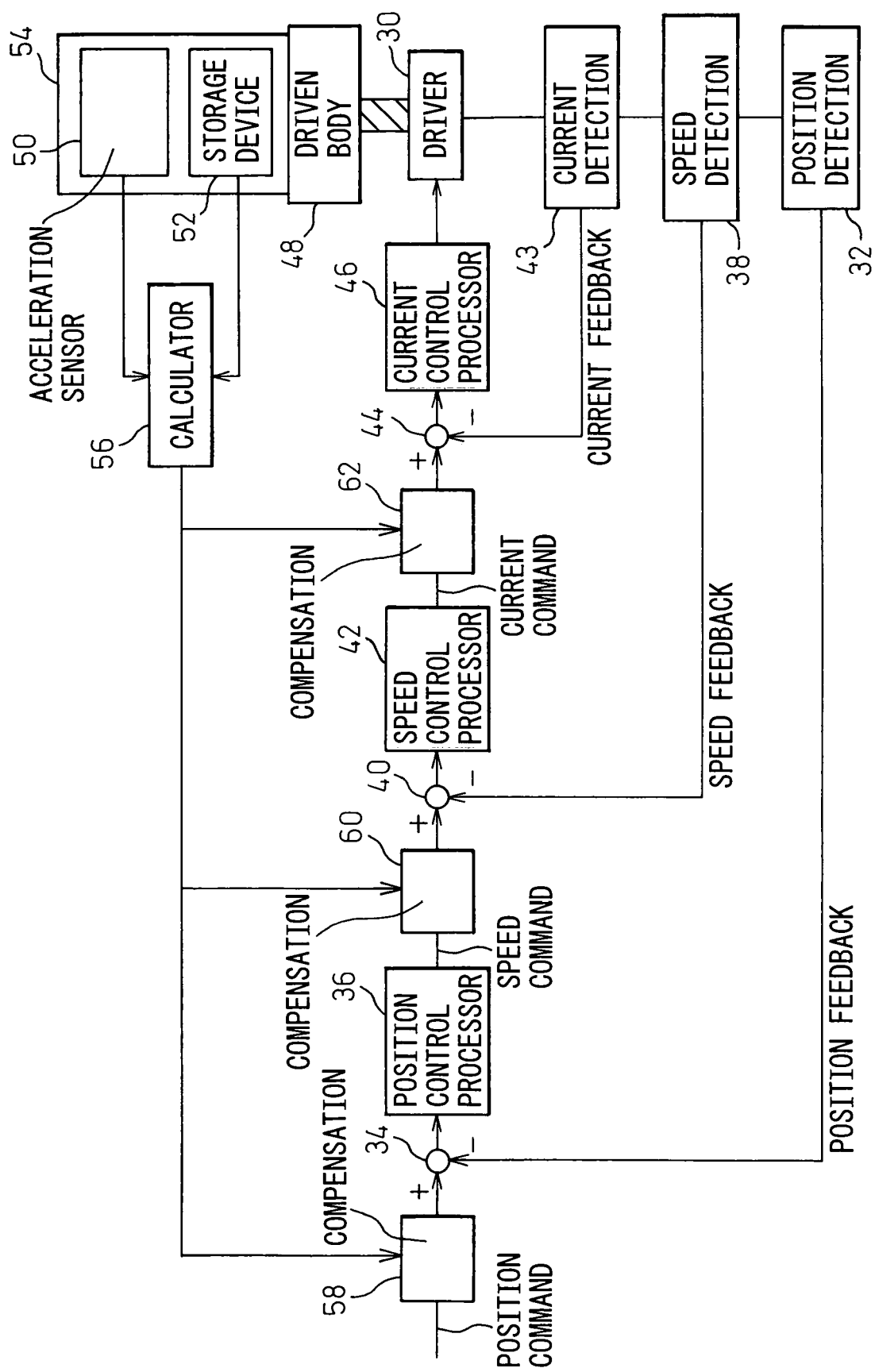
FIG. 1 is a block diagram showing one configuration example of a machine tool control apparatus according to the present invention.

FIG. 1 is a block diagram showing one example of a machine tool control apparatus according to the present invention.

In FIG. 1, data concerning the position detected by a position detector 32 connected to a driver 30 is used as a position feedback signal and, from the difference (34) between this signal and a position command, a position control processor 36 computes a speed command value using, for example, a known PID operation. Data concerning the speed detected by a speed detector 38 is used as a speed feedback signal and, from the difference (40) between this signal and the speed command value, a speed control processor 42 computes an electric current command value using, for example, a known PID operation. Further, the electric current of the driver 30 is detected by an electric current detector 43 and, from the difference (44) between the detected electric current and the electric current command value, an electric current control processor 46 computes an electric current control value using, for example, a known PID operation, and supplies the control value to the driver 30.

An acceleration detector 54 comprising an acceleration sensor 50 and a storage device 52 is mounted on a driven body 48, which is connected to and driven by the driver 30, and detects the acceleration of the driven body 48. In a calculator 56, the acceleration detection value output from the acceleration sensor 50 is compensated by using a compensation value stored in the storage device 52. The compensated acceleration value is used for the compensation (58) of the position command, the compensation (60) of the speed command, and the compensation (62) of the electric current command, to suppress or prevent the vibration that can occur due to the intervention of a low-rigidity part between the driver 30 and the driven body 48.

Figure 2:
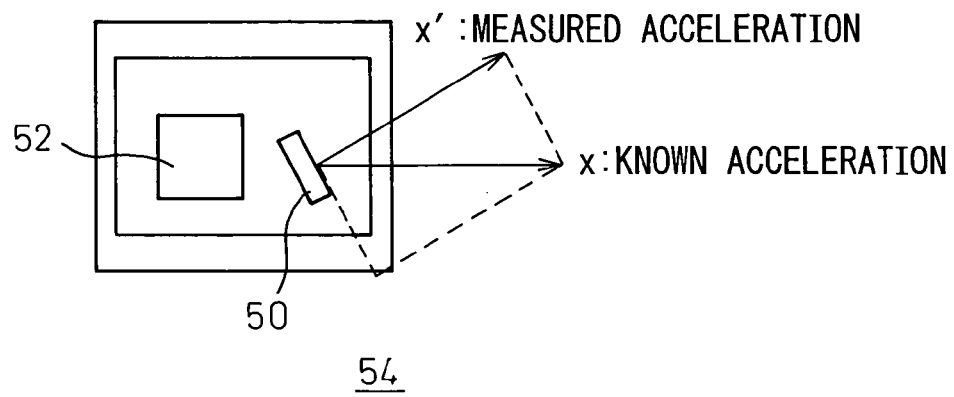
FIG. 2 is a diagram for explaining a first example of acceleration compensation.

FIG. 2 is a diagram for explaining how the compensation is made when detecting an acceleration in one axis direction by a one-axis acceleration sensor. If x' is obtained as the measured value when a known acceleration x is applied in the direction in which the acceleration is to be detected; then, a=x/x', for example, is stored as the compensation value in the storage device 52. In operation, the acceleration value output from the acceleration sensor 50 is multiplied by the compensation value, a, read out of the storage device 52, to obtain the compensated true acceleration value.

Figure 3:
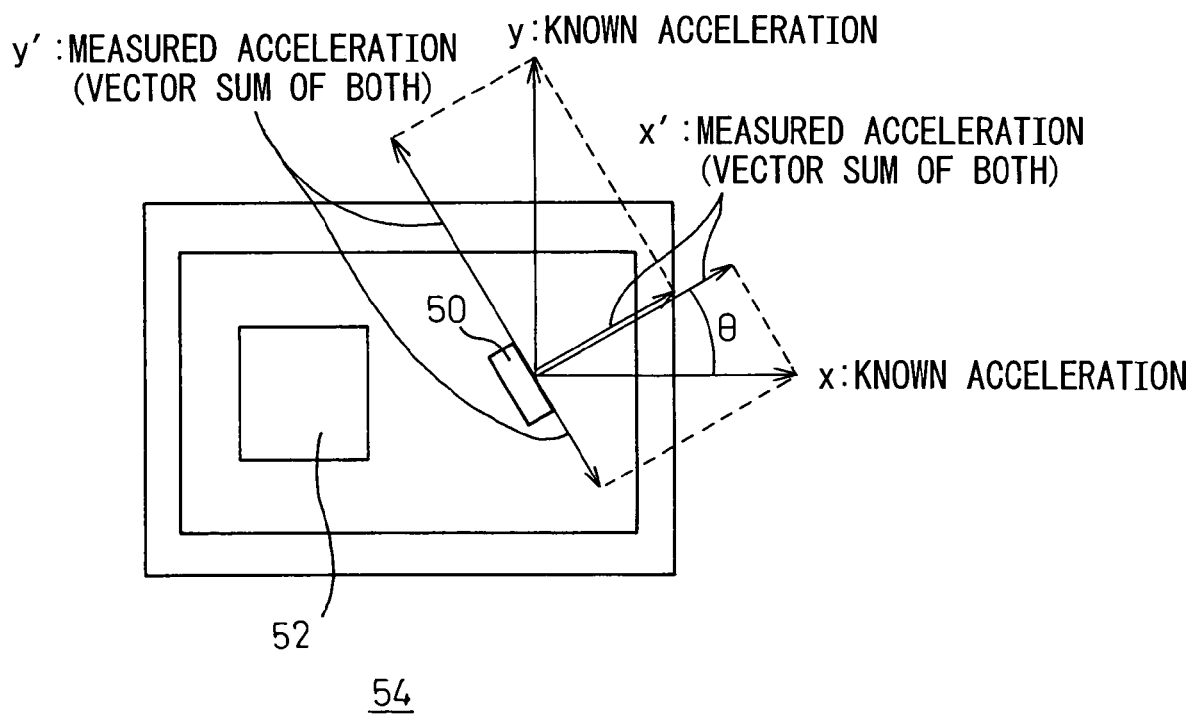
FIG. 3 is a diagram for explaining a second example of acceleration compensation.

In the case of an acceleration sensor that detects accelerations in two axis directions, it is assumed that measured values x' and y' are obtained when an acceleration x is applied in a first direction in which the acceleration is to be detected and an acceleration y in a second direction at right angles to the first direction, as shown in FIG. 3. Then, assuming that there are no errors in the absolute values of the detected accelerations, the relationship between the two can be expressed, using an angle θ, as $$\begin{pmatrix} x' \\ y' \end{pmatrix} = \begin{pmatrix} \cos\theta & \sin\theta \\ -\sin\theta & \cos\theta \end{pmatrix} \begin{pmatrix} x \\ y \end{pmatrix}$$

Therefore, the angle θ is stored in the storage device 52, and the detected accelerations are compensated as $$\begin{pmatrix} x \\ y \end{pmatrix} = \begin{pmatrix} \cos\theta & -\sin \\ \sin\theta & \cos\theta \end{pmatrix} \begin{pmatrix} x' \\ y' \end{pmatrix}$$

In the case of a three-axis sensor, the angle is stored as the compensation value in a similar manner.

Figure 4:
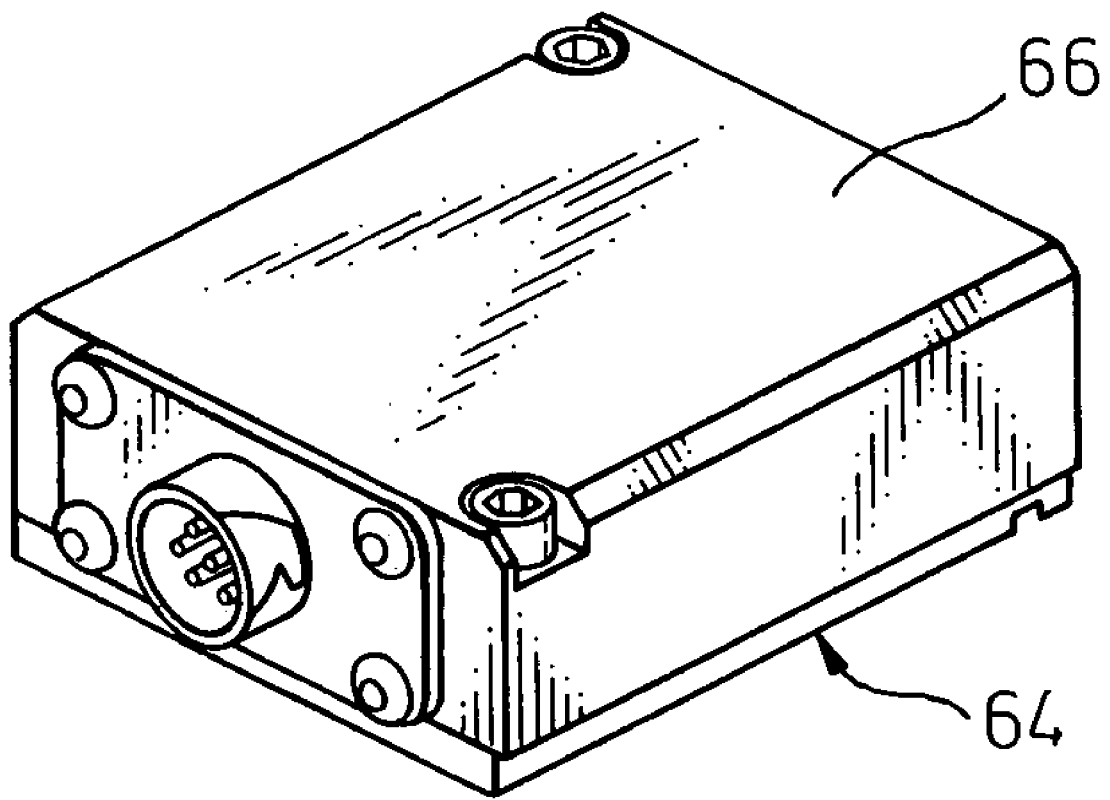
FIG. 4 is a perspective view of a casing that contains an acceleration sensor.

The acceleration sensor 50 and the storage device 52 are preferably housed in a casing 64 having a flat datum plane 64, as shown in FIG. 4. When installing the individual sensor in the apparatus, the sensor is mounted by using the datum plane as a reference, and the measured value output from the acceleration sensor 50 is compensated by using the compensation value read out of the storage device 52; in this way, the properly compensated acceleration value can be obtained. A nonvolatile memory such as an E²PROM or a flash memory can be used as the storage device 52.

The invention claimed is:

1. A machine tool control apparatus comprising:
   a position/speed detector detecting at least one of the speed and position of a driven body;
   a control processor controlling the driving of said driven body based on a command value for at least one of the speed and position of said driven body and on a detection value fed from said position/speed detector;
   an acceleration detection element detecting the acceleration of said driven body;
   a storage device storing a compensation value to be used for compensating said acceleration detected in operation by said acceleration detection element; and
   a compensating means for compensating an acceleration detection value by using a measured value output from said acceleration detection element and also using said compensation value stored in said storage device, wherein
   at least one command value, selected from among the command values for the speed and position of said driven body and a command value for an electric current, is compensated based on said acceleration compensated by said compensating means.

2. A machine tool control apparatus according to claim 1, wherein said compensation value is a value for compensating the magnitude of said acceleration.

3. A machine tool control apparatus according to claim 1, wherein said compensation value is a value for compensating the direction of said acceleration.

4. A machine tool control apparatus according to claim 1, further comprising a casing for housing said acceleration detection element and said storage device, wherein at least one of the outer faces of said casing is formed flat to provide a datum plane that serves as a reference for mounting.

* * * * *